United States Patent [19]
Khelifa et al.

[11] Patent Number: 5,566,880
[45] Date of Patent: Oct. 22, 1996

[54] PROCESS AND APPARATUS FOR HEATING THE PASSENGER COMPARTMENT OF A MOTOR VEHICLE

[75] Inventors: Noureddine Khelifa, Stuttgart; Karl-Gerd Krumbach, Burgstetten; Michael Löhle, Esslingen; Günter Abersfelder, Sindelfingen; Helmut Grantz, Sindelfingen; Wolfgang Odebrecht, Sindelfingen; Jürgen Wertenbach, Fellbach; Oliver Wagner, Filderstadt, all of Germany

[73] Assignees: Behr GmbH & Co.; Mercedes-Benz Aktiengesellschaft, both of Stuttgart, Germany

[21] Appl. No.: 192,094

[22] Filed: Feb. 4, 1994

[30] Foreign Application Priority Data

Feb. 11, 1993 [DE] Germany ............... 43 04 076.4

[51] Int. Cl.$^6$ ............... B60H 1/22; B60H 3/00
[52] U.S. Cl. ............... 237/12.3 A; 62/94
[58] Field of Search ............... 237/12.3 A, 12.3 B; 62/93, 94, 244; 34/80

[56] References Cited

U.S. PATENT DOCUMENTS

| 4,007,875 | 2/1977 | Stolz et al. ............... 237/12.3 A |
| 4,887,438 | 12/1989 | Meckler ............... 62/94 |
| 5,176,005 | 1/1993 | Kaplan ............... 62/94 |
| 5,335,719 | 8/1994 | Khelifa ............... 62/239 |
| 5,388,423 | 2/1995 | Khelifa ............... 237/12.3 A |
| 5,435,150 | 7/1995 | Khelifa et al. ............... 62/94 |

FOREIGN PATENT DOCUMENTS

| 0515865 | 12/1992 | European Pat. Off. . |
| 2050898 | 4/1972 | Germany . |
| 4206611 | 9/1992 | Germany . |

OTHER PUBLICATIONS

Patent Abstracts of Japan vol. 8, No. 186, (M–320)(1623) Aug. 25, 1984.
Patent Abstracts of Japan vol. 6, No. 33 (M–114)(911) 27. Feb. 1982.

*Primary Examiner*—Thomas N. Moulis
*Attorney, Agent, or Firm*—Foley & Lardner

[57] ABSTRACT

A process for heating the passenger compartment (10) in a motor vehicle, particularly an electric vehicle, having a heating device (12), which is supplied with an air current (40) extracted, via a waste-air duct (11), from the passenger compartment (10). The air current enters into the passenger compartment (10) from the heating device (12) via an intake-duct (13). In order to prevent internal misting of the vehicle's windows, even with a low heating capacity, at least one partial air current (40a), which is branched off from the air current (40) prior to entry into the passenger compartment (10), flows through a sorbent (15) such as zeolite or the like.

20 Claims, 2 Drawing Sheets

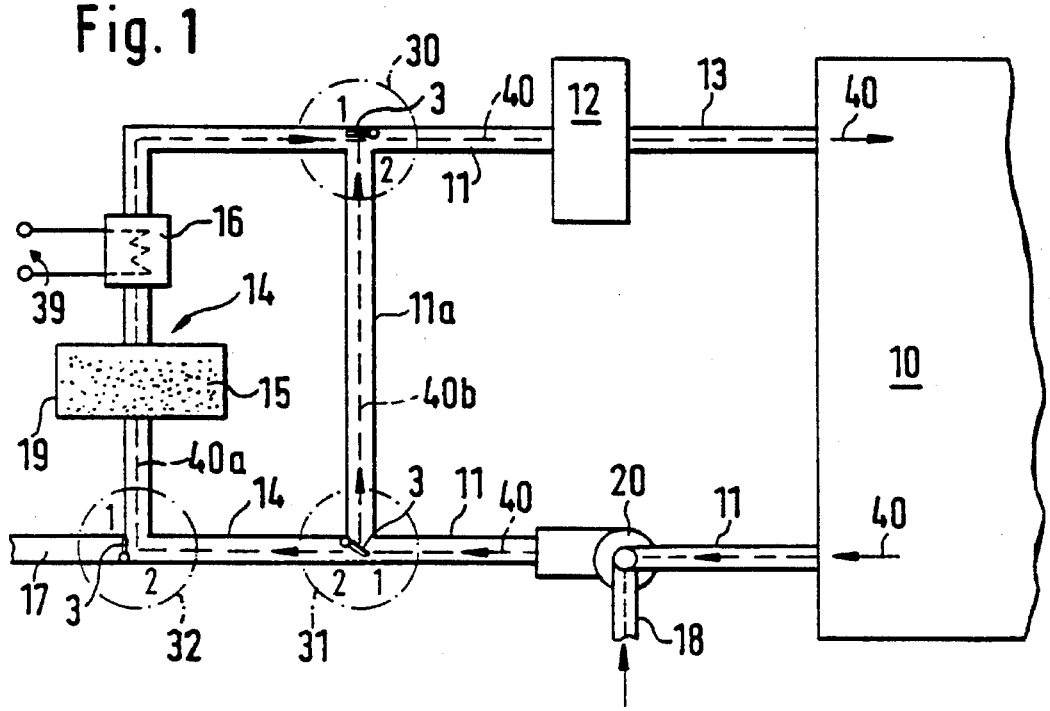
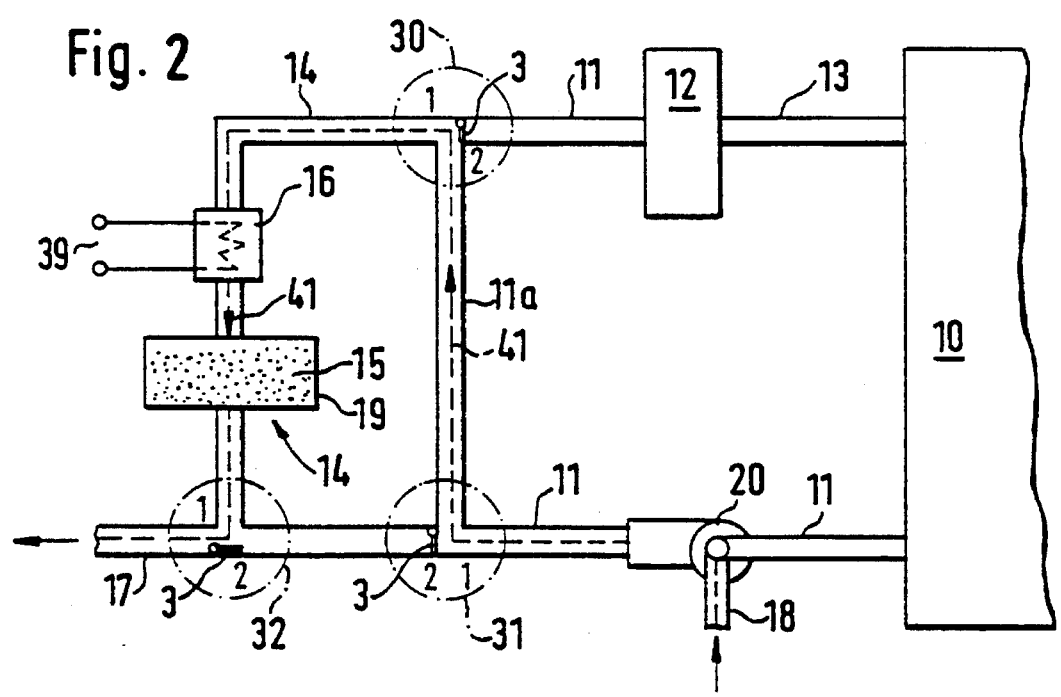

Fig. 3
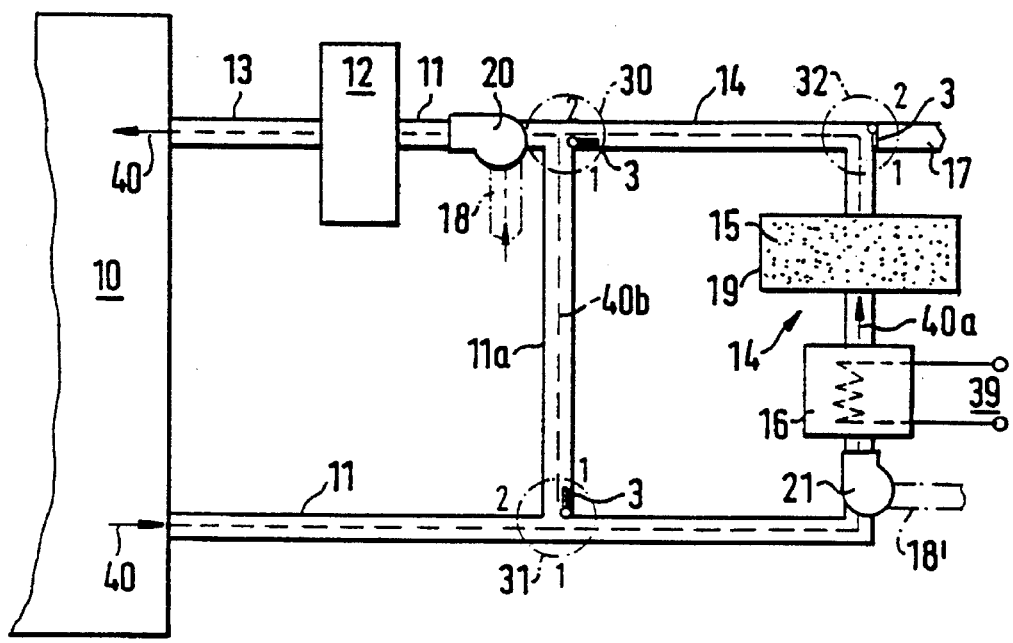
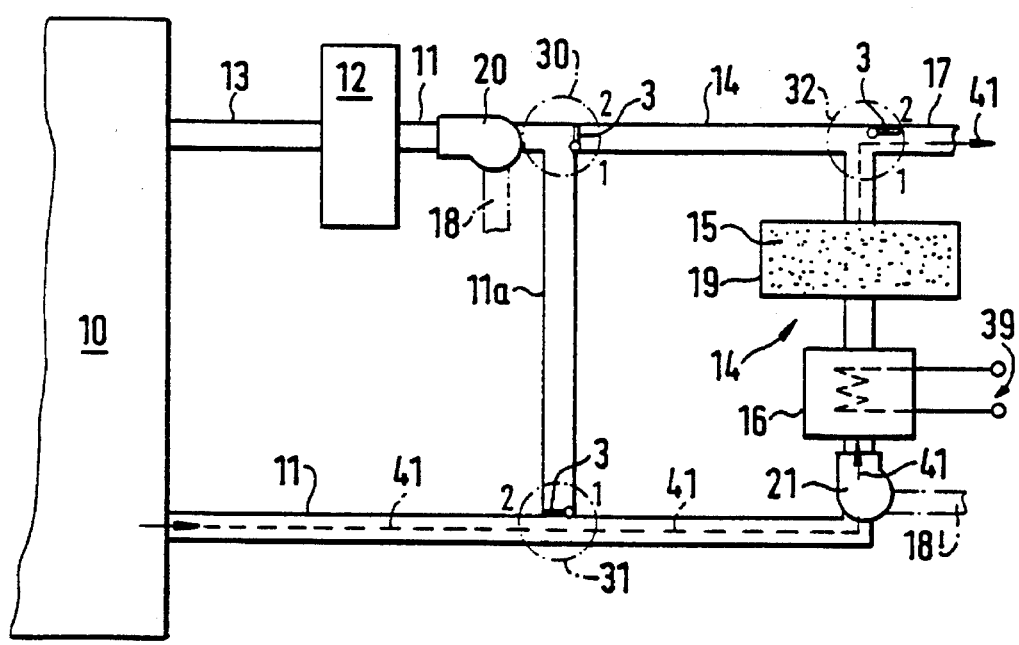
Fig. 4

PROCESS AND APPARATUS FOR HEATING THE PASSENGER COMPARTMENT OF A MOTOR VEHICLE

BACKGROUND OF THE INVENTION

The present invention relates to a process and apparatus for heating the passenger compartment of a motor vehicle, and more particularly to a process and apparatus for heating the passenger compartment of an electric vehicle.

In motor vehicles having a combustion engine, the waste heat from the engine is used for heating purposes, so that sufficient heat energy is generally available under virtually all operating conditions. Although in damp or dank weather the windows of a motor vehicle can generally be prevented from misting up by suitably strong heating of the passenger compartment, the heating energy required for this purpose is only available after the vehicle has been operated for a long period of time. Immediately after the combustion engine is started up, misting of the windows, accompanied by icing-up under very low external temperatures, is therefore often inevitable. Despite this, the vehicle is often set in motion without any regard being paid to the considerable visual obstruction created and to the danger accompanying the operation of a vehicle so affected. In electric vehicles specifically, in which only a small amount of waste heat is available to heat up the passenger compartment, the internal misting and, where appropriate, internal icing-up of the vehicle's windows represents a considerable problem which impairs traffic safety. Although a more rapid heating of the passenger compartment can be achieved by utilizing appropriate electrical heating devices, a considerable quantity of electrical energy is required by such devices, placing a corresponding load on the batteries and possibly leading to a severe curtailment of the vehicle's operating range. During winter operation in particular, the capacity of the batteries is in any case restricted by the cold, and any necessary heating of the passenger compartment adversely restricts the capacity for use of an electric vehicle.

SUMMARY OF THE INVENTION

Accordingly, it is an object of the present invention to provide an apparatus and process for heating a passenger compartment, in which the windows of the passenger compartment are prevented from misting up on the inside using only a small heating capacity.

In accomplishing this and other objects, there is provided according to one aspect of the invention a process for heating the passenger compartment of a motor vehicle having a heating device, comprising the steps of a) drawing an air current from a waste-air duct connected to the passenger compartment; b) supplying the heating device with the air current; c) discharging the air current from the heating device into an intake-air duct which is connected to the passenger compartment; d) branching-off a partial air current from the air current prior to the passenger compartment; e) dehumidifying the partial air current by flowing it through a sorbent; and f) directing the partial air current into the passenger compartment.

According to another aspect of the invention, there is provided an apparatus for heating a passenger compartment of a motor vehicle, comprising an intake-air duct which supplies an air current into the passenger compartment; a waste-air duct which draws an air current from the passenger compartment; a duct section connected between the intake-air duct and the waste-air duct; a drying duct connected in parallel to the duct section via at least one air-current control element, the drying duct being filled over a portion of its length with a sorbent; and a heating device connected to the passenger compartment by the intake-air duct and the waste-air duct. In preferred embodiments, the drying duct defines therein a chamber which contains the sorbent and which has a predetermined receiving capacity, a discharge-air duct is connected to the drying duct upstream of the chamber, and a desorbing heating device is disposed in the drying duct downstream of the chamber.

Other objects, features and advantages of the present invention will become apparent to those skilled in the art when the preferred embodiments are more fully described below with reference to the drawings.

BRIEF DESCRIPTION OF THE DRAWINGS

Further features of the invention will be described with reference to the drawings, in which:

FIG. 1 shows a diagram of an apparatus for heating a passenger compartment, having a single fan, FIG. 2 shows a diagram of the apparatus according to FIG. 1 in desorption mode, FIG. 3 shows a diagram of a further embodiment of an apparatus according to FIG. 1, having two fans, and FIG. 4 shows a diagram of the apparatus according to FIG. 3 in desorption mode.

DETAILED DESCRIPTION OF THE PREFERRED EMBODIMENTS

In the apparatus represented diagrammatically in FIG. 1, there is connected to a passenger compartment 10 of a motor vehicle, such as an electric vehicle, a waste-air duct 11 and an intake-air duct 13. The waste-air duct 11 is connected via a heating device 12 to the intake-air duct 13. In the embodiment according to FIG. 1, a fan 20 is disposed in the waste-air duct 11. Advantageously, a fresh-air duct 18 is connected to the fan 20, so that a predetermined quantity of fresh air can be conveyed, together with the waste-air current 40, by the fan 20.

Oriented parallel to a part-section 11a of the waste-air duct 11 is a drying duct 14, which is preferably connected via air-current control elements 30 and 31 to the waste-air duct 11. The drying duct 14 is connected to a chamber 19, which is filled, over the entire flow cross-section, with a sorbent 15, e.g., zeolite or silica gel.

In order to heat up and/or dehumidify the air in the passenger compartment 10, an air current 40 is conveyed by means of the fan 20 from the passenger compartment 10 to the heating device 12 via the waste-air duct 11. At the heating device 12, the air current 40 is heated and then returned, via the intake-air duct 13, into the passenger compartment 10. Since the air current 40 is preferably a circulating-air current, the quantity of heat required to heat up the passenger compartment 10 is less than if a pure fresh-air current is supplied, notwithstanding the fact that it may be expedient to do so. The heating device 12 can be an exhaust-gas heat exchanger, a heat exchanger through which flows the cooling water of the engine, or even an electrical heating device (in the case of electric vehicles). The heating device 12 can also make use of the waste heat from the drive system or from the batteries of the electric vehicle.

The valve 3 of the air-current control element 31 is positioned such that a partial air current 40a branches off into the drying duct 14 from the waste-air current 40 flowing in the waste-air duct 11. The partial air current 40a flows through the sorbent 15 which preferably is charged in the chamber 19, whereupon the moisture contained in the partial air current 40a is adsorbed. The reaction heat which is released during the adsorption is largely taken up by the partial air current 40a, so that the latter reenters the waste-air duct 11 as a heated air flow by virtue of the air-current control element 30, the valve 3 of which is set at the position "1". Preferably, the partial air current 40a leaving the drying duct 14 and the residual air current 40b leaving the duct section 11a are combined before the heating device 12, whereby the temperature level of the total air current 40 is raised prior to entry into the heating device 12. The quantity of heat which is ultimately required in the heating device to heat the air current 40 to the desired temperature can thus be minimized.

Since the air current 40 entering into the passenger compartment 10 is dehumidified, the windows of the passenger compartment are prevented from misting up without a substantial amount of heating energy having to be produced. In order to ensure rapid dehumidification, the valve 3 of the air-current control element 31 can also be set for a predetermined time span in such a way that the duct section 11a is closed off, so that the total air current 40 flows through the sorbent 15 and is dehumidified. By adjusting the valve 3 of the air-current control element 31, the driver of the motor vehicle is able to set the desired dehumidification of the passenger compartment 10. It has been shown in practice that only small quantities of sorbent are required for the dehumidification. Thus, the chamber 19 need only exhibit a small cubic capacity of, for example, 4 liters. Even where only a small installation space is available, an apparatus of this type can still be used.

If the valves 3 of the air-current control elements 30, 31 and 32 are switched over to setting "2" (FIG. 2), a fresh-air current from the fan 20, which fresh-air current preferably enters via the fresh-air duct 18, is able to enter into the bridging duct 14 via the duct section 11a and the air-current control element 30. A heating device 16 is disposed in the bridging duct before the chamber 19 in the direction of flow. The heating device 16 is preferably an electrical PTC heating device which, whenever the batteries of an electric vehicle are charged, can be connected up to a 220 volt power supply 39. The heating device 16 heats the air current 41 prior to entry into the chamber 19, so that the sorbent 15 is desorbed adiabatically by the entering warm air. The air current 41 discharging the moisture from the sorbent 15 is evacuated via a discharge-air pipe socket 17, which is connected, via the air-current control element 32, to the drying duct 14 downstream of the chamber 19. It has been shown that desorption of a reaction chamber 19 holding approximately 4 liters (depending upon various parameters) takes only about 20 to about 60 minutes. The cubic capacity of the chamber 19 is sufficient to dehumidify the passenger compartment 10 effectively for a period of about 2 hours. If a zeolite is used as the sorbent, a desorption at a temperature of about 120° C. is expedient; under such a temperature, the chamber 19 should consist of a metal, preferably aluminum. If silica gel is used as the sorbent, a desorption at temperatures of around 80° C. is sufficient, so that the chamber 19, just like the air ducts, is able to be made from synthetic material.

Following the desorption phase (FIG. 2), the air-current control elements 30 and 32 are switched back to the position designated "1" as shown in FIG. 1, so that a partial air current 40a of predetermined quantity determined by the position of the valve 3 of the air-current control element 31 can be supplied to the chamber 19 for dehumidification via the drying duct 14. In the desorption phase (FIG. 2), the air current 41 flows through the sorbent in a direction counter to the flow of the partial air current 40a in the adsorption phase (FIG. 1).

In another preferred embodiment of the invention, the heating device 16 in the drying duct 14 is disposed upstream of the chamber 19 in the direction of flow of the partial air current 40a (FIG. 3). At the same time, the discharge-air duct 17 is connected downstream of the chamber 19 via the air-current control element 32. Upstream of the heating device 16 there is disposed a further fan 21, which conveys the partial air current 40a. By adjusting the rotation speed of the fan 21, the quantity of the partial air current 40a can be set. The rotation speed is preferably controlled by means of an electronic rotation speed-setting member (not shown) which operates in response to an output signal from a moisture sensor (not shown) disposed in the passenger compartment 10.

During the heating operation of the apparatus shown in FIG. 3, the fan 20 disposed between the air-current control element 30 and the heating device 12 sucks up, via the waste-air duct 11, the air current 40. As described previously in connection with the embodiment shown in FIGS. 1 and 2, a fresh-air duct 18 for supplying fresh air in predetermined quantity can be connected to the fan 20. The air current 40 enters the heating device 12, is heated and then supplied via the intake-air duct 13 to the passenger compartment 10.

The valve 3 of the air-current control element 31 is set at the position designated "1", giving clearance to both the duct 11a and the drying duct 14 over their entire cross-sections. The branched-off partial air current 40a is determined, in terms of its quantity, by the rotation speed of the fan 21. It can be advantageous to connect a fresh-air duct to the fan 21 through which fresh air can be supplied in predetermined quantity. After flowing through the sorbent 15 in the chamber 19, the partial air current 40a combines with the residual-air current 40b at the air-current control element 30, the valve 3 of which is set at the position designated "1". The total air current 40 is then supplied, in the manner described, to the fan 20 upstream of the heating device 12.

For the desorption of the sorbent 15, an air current 41 is drawn by the fan 21 from the passenger compartment 10 or from the environment via a fresh-air duct 18', and is supplied to the heating device 16 in the drying duct 14. The air current 41 supplied to the heating device 16 can also be a mixed air current. The heated air current enters the chamber 19, takes up the water bound up in the sorbent and thereupon cools down. The moist air current 41 is evacuated via the air-current control element 32, set at the position designated "2", and via the discharge-air pipe socket 17.

By means of the heating device, an air current extracted from the passenger compartment is heated up and returned via the intake-air duct into the passenger compartment. The heating of the circulating air requires only a small amount of energy. A partial air current of 10 the circulating air, prior to entry into the passenger compartment, flows through a sorbent, such as zeolite, silica gel or the like, and the moisture contained in the partial air current is adsorbed. The reaction heat which is thereby released is taken up by the partial air current, so that the partial air current is heated up even without flowing through the heating device. Preferably, the partial air current is returned to the waste-air duct, upstream of the heating device.

As described previously, the drying duct conducting the partial air current is completely filled, over part of its flow path, with the sorbent. In particular, the drying duct defines therein a chamber, containing the sorbent, of predefined receiving capacity.

While there has been described and illustrated specific embodiments of the invention, it will be obvious that various changes, modifications and additions can be made herein without departing from the field of the invention which should be limited only by the scope of the appended claims.

What is claimed is:

1. A process for heating the passenger compartment of a motor vehicle having a heating device, comprising the steps of:
   a) drawings an air current from a waste-air duct connected to said passenger compartment;
   b) supplying said heating device with said air current;
   c) discharging said air current from said heating device into an intake-air duct which is connected to said passenger compartment;
   d) branching-off a partial air current from said air current prior to supplying said heating device with said air current;
   e) dehumidifying said partial air current by flowing it through a sorbent; and
   f) directing said partial air current into said passenger compartment.

2. A process according to claim 1, wherein said branching-off step comprises branching-off said partial air current from said waste-air duct before said air current reaches said heating device.

3. A process according to claim 1, wherein said step of directing said partial air current into said passenger compartment comprises returning said partial air current into said waste-air duct upstream of where said air current reaches said heating device.

4. A process according to claim 1, further comprising the step of supplying a portion of said air current with a predetermined quantity of fresh air before performing said branching-off step.

5. A process according to claim 1, wherein the drawing and branching-off steps are accomplished with a fan.

6. An apparatus for heating a passenger compartment of a motor vehicle, comprising:
   an intake-air duct which supplies an air current into said passenger compartment;
   a waste-air duct which draws an air current from said passenger compartment;
   a duct section connected between said intake-air duct and said waste-air duct;
   a drying duct connected in parallel to said duct section via at least one air-current control element, said drying duct being filled over a portion of its length with a sorbent; and
   a heating device connected to said passenger compartment by said intake-air duct and said waste-air duct.

7. An apparatus according to claim 6, wherein said drying duct defines therein a chamber which contains said sorbent and which has a predetermined receiving capacity.

8. An apparatus according to claim 6, further comprising a discharge-air duct connected to said drying duct upstream of said portion containing said sorbent, and a desorbing heating device disposed in said drying duct downstream of said portion containing said sorbent.

9. An apparatus according to claim 7, further comprising a discharge-air duct connected to said drying duct upstream of said chamber, and a desorbing heating device disposed in said drying duct downstream of said chamber.

10. An apparatus according to claim 6, wherein said drying duct lies parallel to a duct section of said waste-air duct.

11. An apparatus according to claim 6, further comprising a fan disposed in said waste-air duct between said passenger compartment and an air-current control element which connects said drying duct to said waste-air duct.

12. An apparatus according to claim 6, further comprising a fan disposed in said waste-air duct directly upstream of desorbing heating device.

13. An apparatus according to claim 7, further comprising a fan disposed in said drying duct upstream of said chamber.

14. An apparatus according to claim 11, further comprising a fresh-air duct connected to said fan.

15. An apparatus according to claim 12, further comprising a fresh-air duct connected to said fan.

16. An apparatus according to claim 13, further comprising a fresh-air duct connected to said fan.

17. A battery electric-powered passenger vehicle comprising a system for alternately heating a passenger compartment in the vehicle with dehumidified air and regenerating a sorbent-containing dehumidifying unit during charging of the vehicle batteries, wherein said system comprises:
   an intake-air duct which supplies an air current into said passenger compartment;
   a waste-air duct which draws an air current from said passenger compartment;
   a duct section connected between said intake-air duct and said waste-air duct;
   a drying duct connected in parallel to said duct section via at least one air-current control element, said drying duct being filled over a portion of its length with a sorbent; and
   a heating device connected to said passenger compartment by said intake-air duct and said waste-air duct.

18. A process for regenerating a sorbent-containing dehumidifying unit that is used to dehumidify an air current which then can be heated and directed into a passenger compartment of a motor vehicle, comprising:
   a) drawing a fresh air current from a fresh-air duct;
   b) heating said fresh air current in a heating device to provide a heated fresh air current;
   c) supplying said sorbent-containing dehumidifying unit with said heated fresh air current so that said heated fresh air current passes through said sorbent in a direction opposite the direction that said air current passes during dehumidification, to desorb and regenerate said sorbent-containing dehumidifying unit and to provide a moist air current; and
   d) discharging the moist air current via a discharge-air pipe socket.

19. The process of claim 18, wherein the drawing step is accomplished with a fan.

20. The process of claim 18, wherein the heating device used to heat said fresh air current is an electrical heating device which is connected to a power supply other than a battery used to provide electricity to said motor vehicle.

* * * * *